Aug. 2, 1966     H. LANGENDORF     3,264,009
REAR LOADING ROAD VEHICLE
Filed Jan. 15, 1964     7 Sheets-Sheet 4

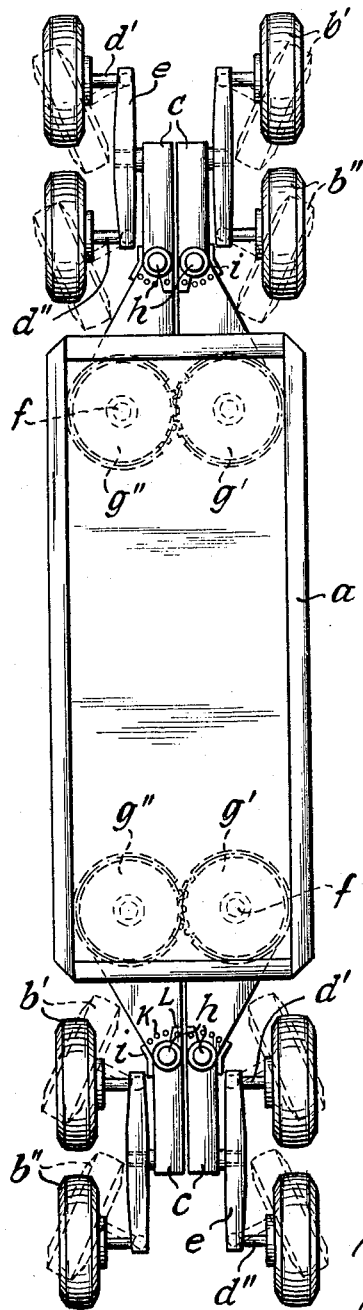

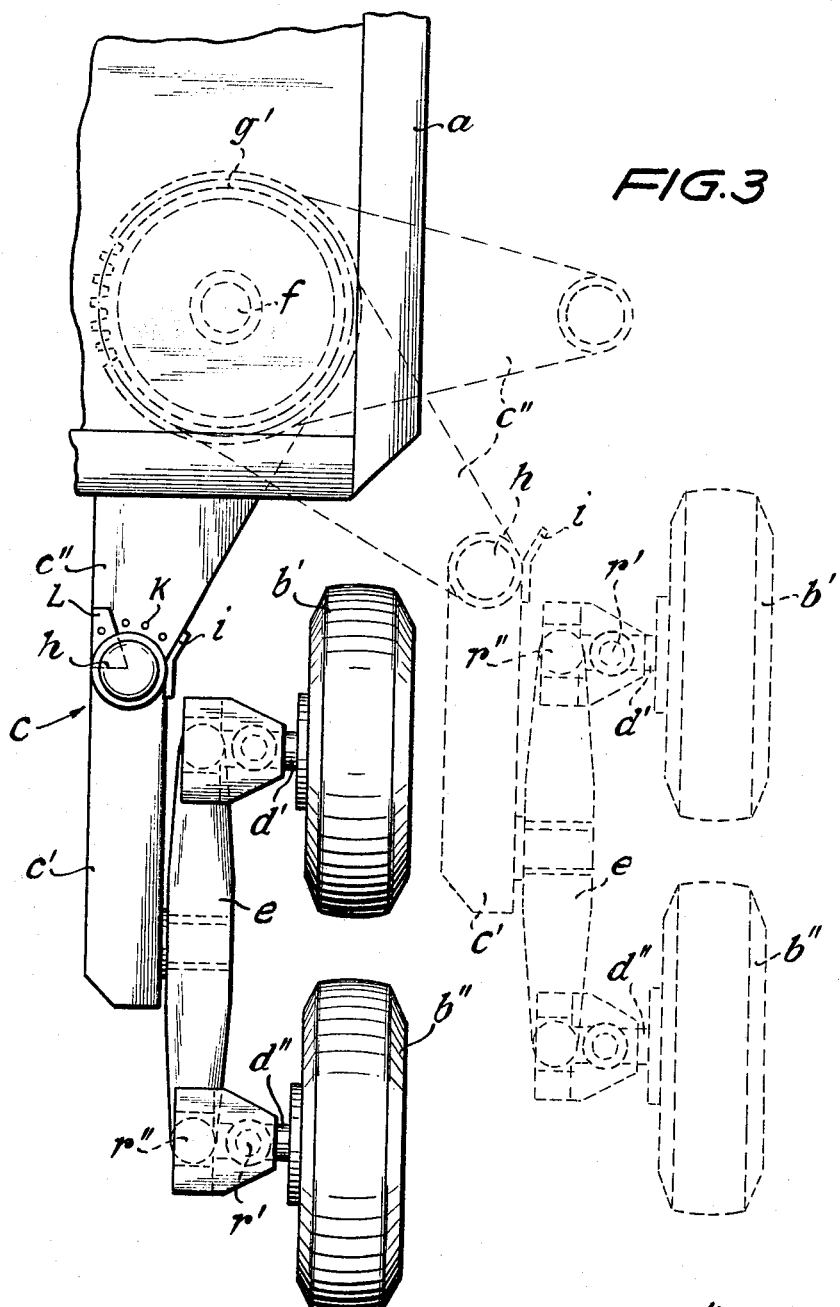

INVENTOR
Heinrich Langendorf
by Malcolm W. Fraser
attorney

United States Patent Office 3,264,009
Patented August 2, 1966

3,264,009
REAR LOADING ROAD VEHICLE
Heinrich Langendorf, 115 Bahnhofstr., Waltrop,
Westphalia, Germany
Filed Jan. 15, 1964, Ser. No. 337,888
Claims priority, application Germany, Jan. 21, 1963,
L 43,939
4 Claims. (Cl. 280—81)

The invention relates to rear loading vehicles, more particularly but not exclusively to vehicles of this kind which are used to transport very heavy loads.

In road vehicles of this kind, the bearing wheel sets are disposed to the rear of the load-bearing surface in order that wheel sets of adequate bearing strength may be provided while the load-bearing surface is positioned very low. Consequently, when it is required to load or unload the vehicle, the wheel sets must be moved aside—i.e., they must be moved out of alignment with the load-bearing surface. In the most recent known constructions, conventionally called "low loaders," the wheel sets or the longitudinal bearers or members which bear the wheel sets are so disposed on the load-bearing surface as to be outwardly pivotable to the side. The two wheel sets are pivoted outwards, in positive relationship to one another, by the members or bearers being pivoted, the longitudinal members being appropriately interconnected. In one very advantageous form of between-bearers connection wheels having teeth over a proportion of their periphery and engaging with one another by way of such teeth are provided on the pivot shafts of the longitudinal members. When, upon the release of a locking device which keeps the wheel sets in the position for travel, the vehicle is moved a short distance backward—and if, for instance, by braking of the outside wheel of one of the wheel sets or by means of different resistances, e.g., as a result of unevennesses of the road, being applied to the two wheel sets, the same are automatically pivoted out aside into a position depending upon the amount by which the vehicle is backed, so that the wheel sets clear the rear part of the load-bearing surface.

In the known arrangements of this kind, the wheel sets are pivoted out substantially to a right-angle; therefore, at the end of the pivoting-out movement the wheel set axles extend in the direction of travel while the wheels extend athwart the direction of travel. Consequently, when the wheel sets are in the pivoted-out position, the vehicle cannot be moved and it is very difficult to pivot the wheel sets in again by the vehicle being driven forwards slowly, particularly if the vehicle is loaded. Also, the permissible load for the vehicle cannot be increased by an increas in the number of wheel sets—each of which has its maximum permissible individual axle loading—for instance, by the provision of a number of wheel sets tandem fashion.

The invention provides an arrangement for laterally outward pivoting wheel sets of a vehicle of the kind specified which obviates the disadvantages mentioned and provides further advantages, for after the wheel sets have been pivoted outwards to a selectable extent, then, once there is unobstructed access to the rear part of the load-bearing surface—and this state is reached when the wheel sets have pivoted outwards much less than in conventional constructions—the wheels can be moved into the position for travel, with the result that available loading width is selectable within wide limits. The fact that the vehicle can be moved with the wheels at any one of a number of selectable lateral spacings—i.e., tracks—in other words, the fact that the track of the wheel sets of a vehicle can be varied, is very useful more particularly when vehicles of this kind have to carry heavy bulky indivisible loads, such as large transformers, boilers, armored vehicles or the like.

According to a main feature of the invention, these advantages are provided, in rear-loading road vehicles having longitudinal members which in the normal position are at the rear of the vehicle and which are outwardly pivotable laterally and which bear the wheel sets or the wheel set axles, in that the wheel-set-bearing longitudinal members are subdivided by an articulation which locks unidirectionally outwards—i.e., against outward pivoting. Consequently, the ends of the longitudinal members which have been pivoted out as a result of the vehicle backing can automatically be pivoted inwards again by the articulation bending during a slight forwards movement of the vehicle after the pivoting-out movement, into a position in which the wheel set axles extend transversely of the direction of travel—i.e., in which the wheels are in the direction for travel. The amount by which the vehicle must be moved forward to return the wheels to the position for straight-ahead travel is slight—as a rule something like 1 to 1.5 meters. The position of the subdividing articulation can be varied to suit requirements—i.e., to suit the amount of lateral outward pivoting required in each particular case.

When the vehicle is driven forward after a pivoting-out step, the lateral distance between the wheel sets—i.e., the lateral distance of the pivots formed by each second articulation from the vehicle center plane—reduces slightly. Appropriate abutments are provided so that the wheel sets can come no closer together than is required to keep the rear end of the load-bearing surface free.

The extent to which the wheel sets have pivoted out—i.e., the final lateral spacing between the wheel sets—can be indicated to the driver by an appropriate audible signal; upon hearing the same he stops backing the vehicle and initiates a slight forward movement.

In one particular embodiment of the invention, the unidirectionally locking articulation is disposed very near the wheel set axles. The track of the wheels when restored to the straight-ahead position is then substantially equal to the pivoting-out distance for, unlike what happens in the first embodiment, the wheels or wheel sets on both sides are not moved towards one another by the articulation bending. The distance by which the vehicle must be driven forward to bring the wheels in to the straight-ahead position is shorter than in the first embodiment, and there are advantages as regards the suspension of the wheels or wheel sets on the longitudinal members.

As will be apparent, it is immaterial for the underlying idea of the invention whether the vehicle has one or more pairs of wheels or wheel sets. Very advantageously for the arrangement according to the invention, the wheels or wheel sets are disposed one after another and are mounted on short bearers, by way of stub axles disposed thereon, which extend outside the outwardly pivoting longitudinal members and which are disposed thereon for vertical pivoting. Equally well, however, in another form of the invention the wheels can be disposed in a twin arrangement on normal wheel set axles on both sides of the longitudinal members. Alternatively, the wheel sets can be disposed tandem fashion on the longitudinal members via intermediate members, with or without lateral staggering. In one very advantageous embodiment of the invention, the two longitudinal members, instead of being mounted as such each for pivoting around a single pivot on the vehicle, are each connected, by way of two links articulated to their ends, to two pivots which are disposed on the vehicle and which are at an axial distance from one another, so that the wheel sets borne by the ends of the longitudinal members are moved parallel with themselves—by pivoting of the links in the same sense—to clear the load-bearing surface. This movement is initiated by one of the wheel sets being braked. This arrangement is useful not only for stabilizing the mounting of the longitudinal members but also, and mainly, because the amount by which the wheel sets must be pivoted out is reduced and the wheels remain in the straight-ahead position throughout the pivoting step. Consequently, unlike what occurs in the embodiments hereinbefore described the vehicle need not be driven forward after backing to return the wheels to the straight-ahead position. The same arrangement can be used with particular advantage—and without departing from the scope of the invention—to move the front wheels or front wheel sets of the vehicle laterally outside the range of the load-bearing surface. It is known per se for the front wheel sets of low loaders to be outwardly pivotable to provide front access to the load-bearing surface. Of course, the arrangement according to the invention is of use with vehicles whose load-bearing surface does not rise or fall during the pivoting-out and pivoting-in of the wheel sets and also with vehicles in which in known manner the load-bearing surface is raised and lowered automatically in association with the pivoting movement of the wheel sets.

The nature of the control and actuation used for independent outward pivoting of the longitudinal members which bear the wheel sets can be just as required, for instance, the mechanical or hydraulic, preferably along the lines hereinbefore described on the basis of meshing toothed rings of wheels rigidly connected to the longitudinal members.

In order that the present invention may be well understood there will now be described some embodiments thereof, given by way of example only, reference being made to the accompanying drawings from which all details not necessary for an understanding of the invention have been omitted.

In the drawings:

FIGURE 1 is a plan view of a low loader according to the invention having the outward pivoting wheel set arrangement, in the embodiment in which the front as well as the rear wheel sets can pivot outwards;

FIGURE 3 shows how the wheel sets illustrated in FIGURE 1 return to the aligned position;

Figure 2A:
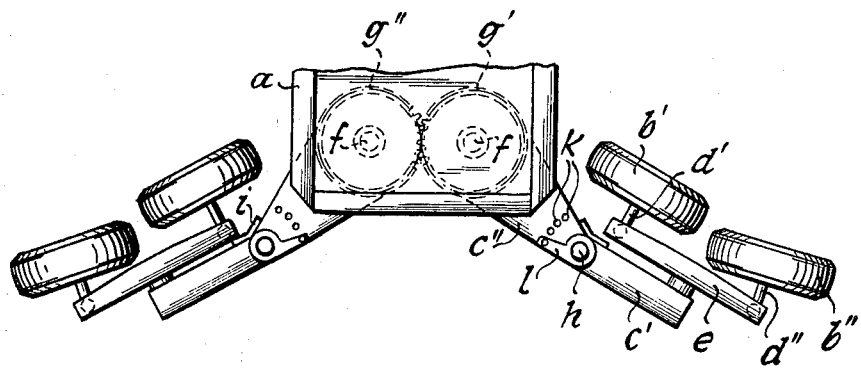
FIGURES 2a and 2b show, with reference to the basic arrangement illustrated in FIGURE 1, various phases during the pivoting of the wheel sets outwards from their normal position.

Referring to the drawings, a load-bearing surface $a$ of a low-loading trailer has—at its front and rear end in this particular embodiment—pairs of longitudinal members $c$ which can pivot around pivots $f$ rigidly secured to the load bearing surface of the vehicle and which respectively bear the front and rear wheel sets of the vehicle. Wheels $g'$, $g''$ having toothed rings which mesh with one another, are disposed on the pivots $f$ in known manner. In this embodiment, each wheel set is in the form of two wheels $b'$, $b''$ which are disposed one behind another and which are mounted on stub axles $d'$, $d''$; the same are disposed on intermediate members $e$ which extend parallel with the longitudinal members and are articulated thereto for vertical pivoting through the agency of intermediate shafts. Each longitudinal member $c$ is subdivided by an articulation $h$ associated with a locking device $i$ of a kind such that that part of the longitudinal member which is beyond the articulation $h$ can only pivot inwards. The wheels $b'$, $b''$ and longitudinal members $c$ are provided with conventional locking means (not shown) to contain them and to prevent them from pivoting outwardly when the vehicle is moving forwardly.

Figure 2B:
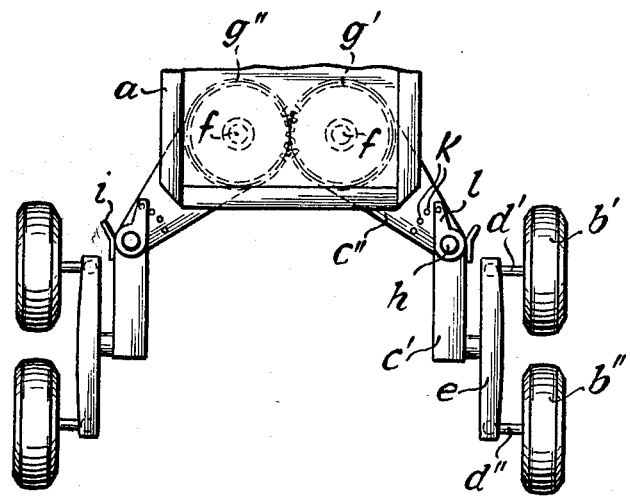

FIGURES 2a and 2b show clearly how the arrangement just described operates. FIGURE 2a shows the conditions operative when, because the vehicle has been backed with one of the wheels braked or just because different resistances are operative upon the wheel sets during backing, the wheel sets have been pivoted out laterally to give clear access to the rear end of the load-bearing surface $a$, so that the wheels are disposed substantially transversely to the direction of travel. The pivot $h$ with its unidirectional locking action, keeps each longitudinal member $c$ in this pivoted-out position. If the vehicle is now driven forwards a few metres, the wheel-set-bearing ends $c'$ of the longitudinal members $c$ pivot around the pivots $h$ into the position which is illustrated in FIGURE 2b and in which the wheels $b'$, $b''$ are in the position for travelling. When the vehicle is driven forward in this position with the wheels at the track determined by their existing lateral spacing, the longitudinal bearer parts $d'$—and therefore the wheels— can be locked against pivoting to both hands, for instance, by means of a pin (not shown) introducible into the corresponding one of a ring of apertures $k$ which are disposed at the end of the forward part $c''$ of the member $c$ and which co-operate with an aperture in extensions $l$ at the end of the part $c'$. To change from this wide-track position to the normal-track position, the vehicle merely has to be driven forward a few meters— where applicable, after release of this locking system—so that the bearer parts $c''$ pivot inwards to return the wheel sets to the position illustrated in FIGURE 1.

FIGURE 3 illustrates to an enlarged scale—and in a form which, in the light of the foregoing, is understandable without further explanation—in respect of the embodiment illustrated in FIGURES 1, 2a and 2b, the initial phase of pivoting-out (in solid line) and the final phase thereof (in chain line), through the agency of the longitudinal members $c$ which are rigid in the pivoting-out direction and which can bend inwards against such direction. FIGURE 3 also shows details of how the wheel sets are suspended on intermediate bearers $e$ which are articulated to the outward pivoting longitudinal members, the articulation of the wheel sets to the intermediate members $e$ being by way of stub axles $d'$, $d''$ disposed on the intermediate members $e$ and, as the references $r'$, $r''$ show, having the nature of a double articulation and, to some extent, of a universal connection.

Figure 4:
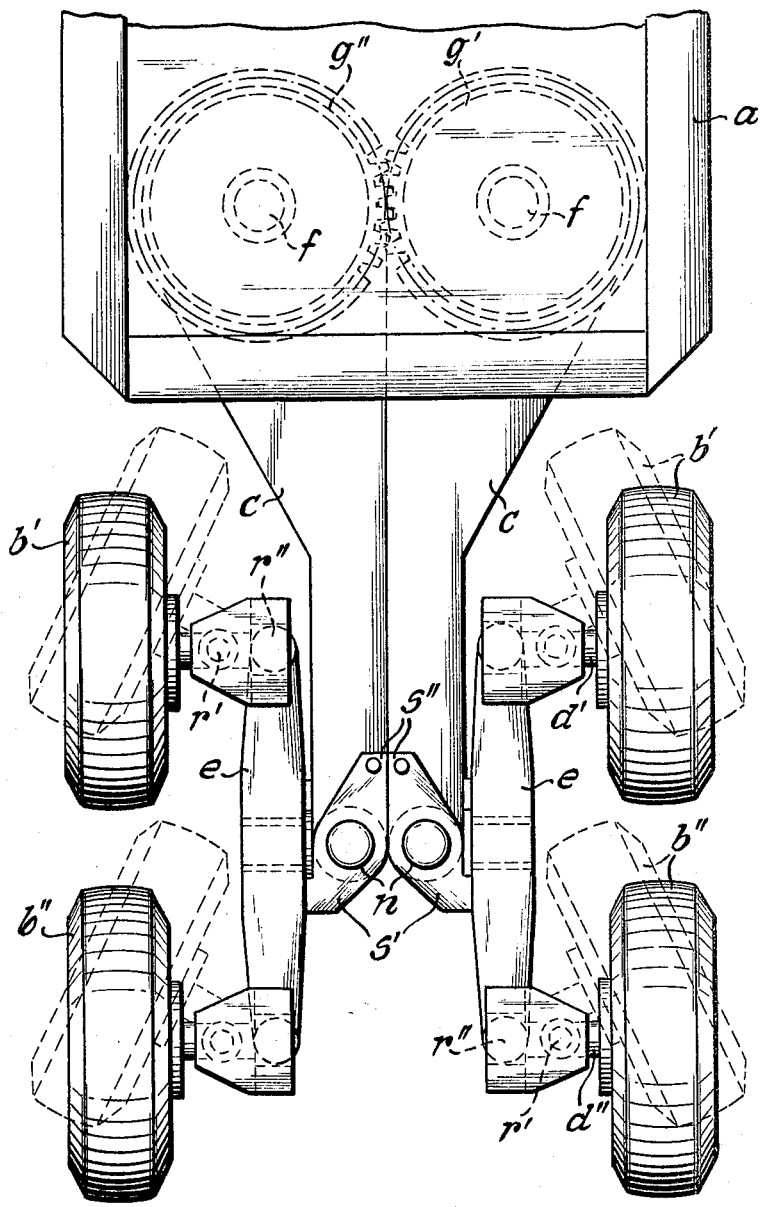
FIGURE 4 is a plan view of another embodiment of the invention in which the pivots around which the wheel sets return to their normal position are disposed at the ends of the longtiudinal members which bear the wheel sets.
Figure 5:
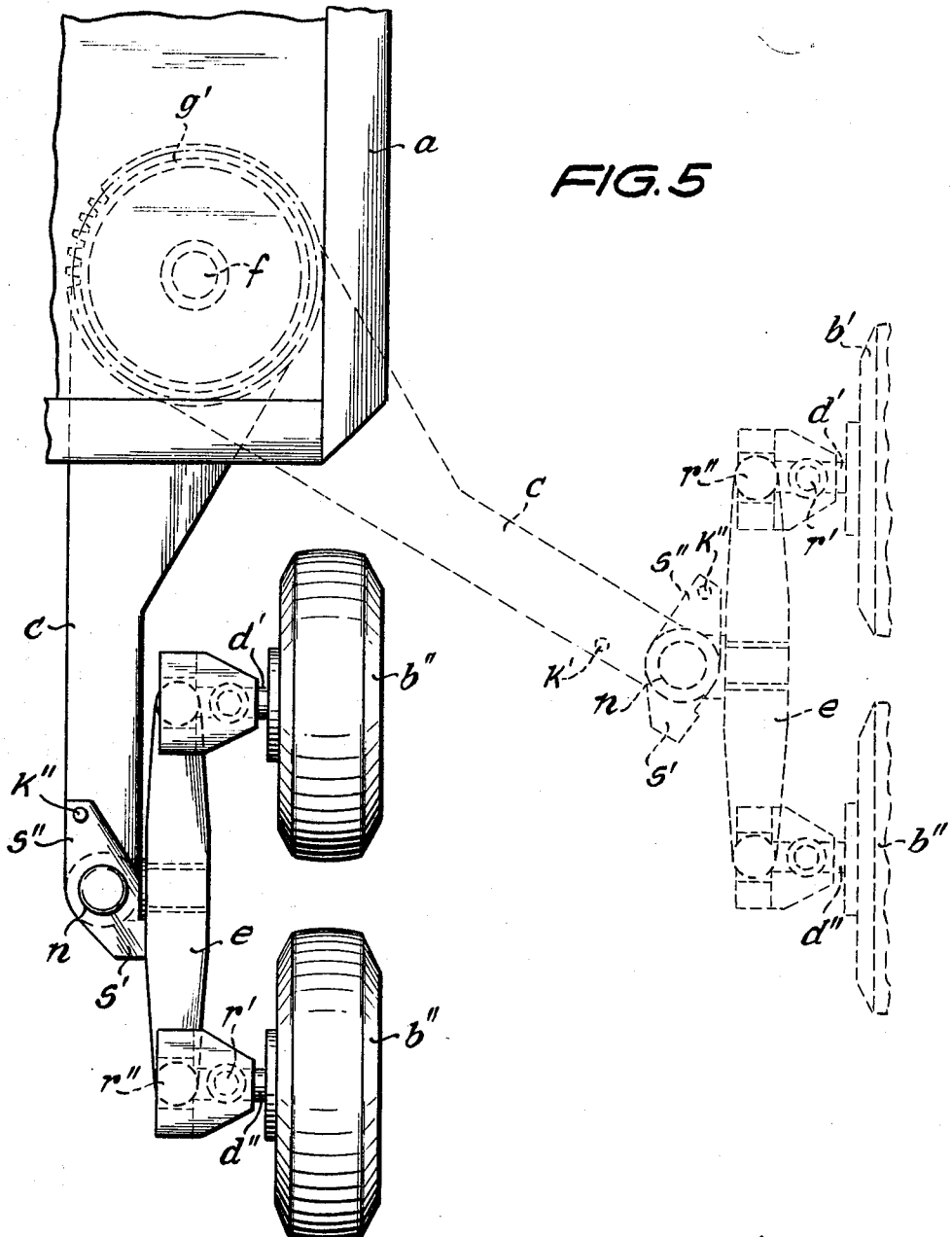
FIGURE 5 shows a wheel set of the arrangement in FIGURE 4, in the pivoted-in and pivoted-out position.

FIGURES 4 and 5 illustrate a modified form of the embodiment illustrated in FIGURES 1 and 2. In this variant, the cardan-like suspension of the wheel sets on the intermediate bearers or members is retained, as can be seen in FIGURE 4, but the pivots $n$ of the longitudinal members $c$ are disposed at the end thereof very near the place where the wheel-set-bearing intermediate members or bearers $e$ are disposed. Operation is fundamentally the same as for the embodiment hereinbefore described and will be apparent from FIGURE 4 without any further description. In this embodiment, the locking abutment $i$ shown in FIGURE 1 is replaced by pivoting abutments $s'$, $s''$ disposed on the articulation at the end of the longitudinal member $c$. When the wheel sets are in the pivoted-in position, one surface $s'$ bears against the wheel-set-bearing member or bearer $e$, to entrain the same during outward pivoting; when the bearer $e$ is pivoted back around the pivot $n$ upon the vehicle being driven a short distance forwards, and as can be seen in FIGURES 4 and 5, the wheels are brought into the direction for travel. It will be noted that an aperture $k'$ is formed in the longitudinal member $c$ which is caused to be aligned with a similar aperture $k''$ in the abutment surface $s''$ when the wheel sets are in the pivoted-in position. When the apertures $k'$ and $k''$ are aligned, a pin member, not shown, may be inserted therein to militate against any relative movement between the wheel sets and their associated longitudinal members $c$.

Figure 6:
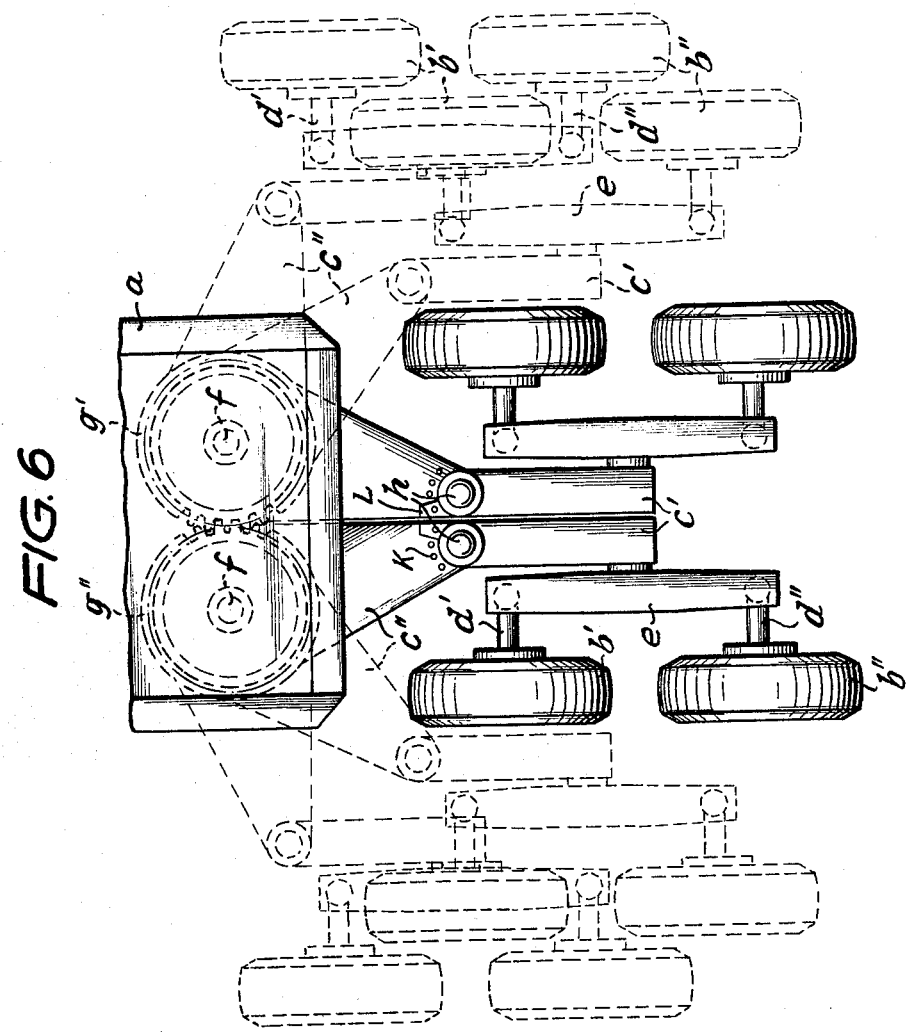
FIGURE 6 shows in diagrammatic form how the invention provides optional track selection.

FIGURE 6 shows, in a manner requiring no further description, the various wheel tracks and useful loading widths which the invention can provide; the wheel sets do not obstruct even very wide loads.

Figure 7:
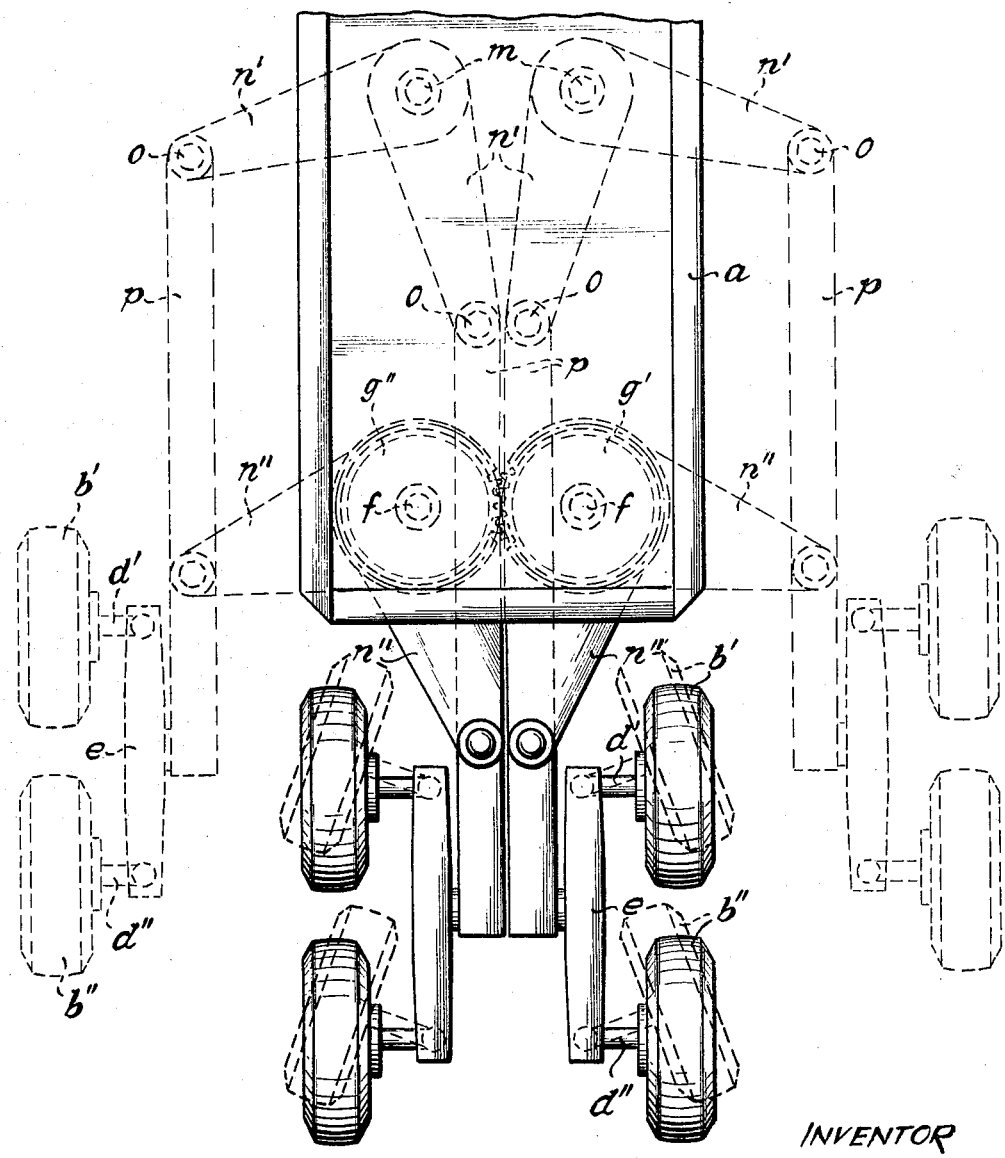
FIGURE 7 is a view, similar to FIGURE 3, of a very advantageous embodiment in which the wheel sets are pivoted aside by a lateral translational movement of the longitudinal members.

Another advantageous embodiment of a pivoting-out system is illustrated in FIGURE 7. In this embodiment, the wheels remain in the direction for travel when they are pivoted out. In this embodiment, the longitudinal member can be extended laterally parallel with itself through the agency of links $n'$, $n''$ pivotally mounted on the vehicle in the same way as for the first embodiment. During the pivoting-out movement the wheels stay in a position parallel with the direction of travel. At least one of the two links $n'$, $n''$ is, just as in the first embodiment, so coupled with the pivoting link in series with it on the other side of the vehicle that the two links perform their pivoting-out movement in a positive relationship to one another. In this embodiment the longitudinal member, which is just a rigid beam or the like, is moved parallel with itself and so, of course, must be able to pass below the wheels $g$ or pivots. In this case, therefore, the articulation which subdivides the longitudinal member $c$ of the first embodiment is replaced by the link guiding of the longitudinal member. FIGURE 7 clearly shows the movement pattern of the longitudinal member during the movement of the wheel set away from the back of the load-bearing surface. In this embodiment, the wheels or wheel sets move laterally and cannot be properly said to pivot.

The invention is not of course limited to the embodiments described and illustrated in the drawings and can be varied without departing from the underlying idea, more particularly with regard to initiation and control of the pivoting-out step.

I claim:

1. A rear loading vehicle including a substantially horizontally disposed load bearing surface; ground engaging rear wheel sets; a longitudinal beam member for each of said wheel sets, one end of each of said beam members being interconnected with the respective end of the other of said beam members for coordinate relative movement, said one end of each of said beam members pivotally connected through first pivot means to the rear end of the vehicle, the other end of each of said beam members pivotally connected through second pivot means to respective wheel sets, each of said longitudinal beam members including at least two elements pivotally interconnected through third pivot means for articulation; and locking means for limiting relative pivotal movement of the elements of said beam members whereby no relative movement of the elements of each of said beam members is effected upon rearward movement of the vehicle, the arrangement being such that during rearward movement of the vehicle each of said beam members can pivot about said first pivot means with said second pivot means locked by said locking means from a normal travelling position to a position in which the wheels are disposed laterally outwardly of said load bearing surface, and during forward movement of the vehicle, each of said beam members can pivot about said first pivot means and the elements of each of said beam members can pivot about said second pivot means whereby said wheels move laterally inwardly to a position of normal travel.

2. A rear loading vehicle as defined in claim 1 wherein said locking means includes means for selectively locking said elements of said beam members for limiting relative pivotal movement therebetween.

3. A rear loading vehicle as defined in claim 1 wherein the individual wheels of said ground engaging rear wheel sets are disposed one after another, and said wheels sets are suspended on stub axles which extend from a wheel axle support which includes said third pivot means.

4. A rear loading vehicle as defined in claim 1, characterized in that said locking means includes a locking member pivotable about the axis defined by the second pivot means and having two abutment surfaces, one of which is positioned to bear against one of the elements of said beam members when the wheel sets are in the normal travelling position, while the other abutment surface is positioned to bear against the other of the elements of said beam member when the wheel sets are in their lateral outward position.

References Cited by the Examiner

UNITED STATES PATENTS

| | | | |
|---|---|---|---|
| 2,318,802 | 5/1943 | Reid | 280—81 |
| 2,431,388 | 11/1947 | Fitzpatrick. | |
| 2,698,188 | 12/1954 | Paldanius | 280—303 |
| 2,713,495 | 7/1955 | Baumann. | |
| 2,886,338 | 5/1959 | French | 280—40 |
| 3,000,523 | 9/1961 | Nicolas | 214—505 |
| 3,003,780 | 10/1961 | Lundahl | 280—104.5 X |
| 3,154,200 | 10/1964 | Versch et al. | 280—35 X |
| 3,184,250 | 5/1965 | Bobrowski | 280—104.5 X |

FOREIGN PATENTS

| | | |
|---|---|---|
| 547,898 | 11/1956 | Belgium. |
| 1,076,279 | 4/1954 | France. |
| 1,220,679 | 1/1960 | France. |
| 1,077,073 | 3/1960 | Germany. |
| 1,078,750 | 3/1960 | Germany. |
| 302,110 | 12/1928 | Great Britain. |
| 893,596 | 4/1962 | Great Britain. |

KENNETH H. BETTS, *Primary Examiner.*

BENJAMIN HERSH, *Examiner.*